(12) United States Patent
Laustela et al.

(10) Patent No.: US 6,318,086 B1
(45) Date of Patent: Nov. 20, 2001

(54) TURBOCHARGER

(75) Inventors: Esko Laustela, Schafisheim;
Karl-Heinz Rohne, Villigen, both of (CH)

(73) Assignee: ABB Turbo Systems AG, Baden (CH)

( * ) Notice: Subject to any disclaimer, the term of this patent is extended or adjusted under 35 U.S.C. 154(b) by 0 days.

(21) Appl. No.: 09/597,694

(22) Filed: Jun. 19, 2000

(30) Foreign Application Priority Data

Jun. 24, 1999 (DE) .............................................. 199 28 925

(51) Int. Cl.⁷ ...................................................... F02B 33/44
(52) U.S. Cl. ............................ 60/612; 723/559.1; 723/562
(58) Field of Search ................................. 60/605.1, 612; 123/562, 559.1

(56) References Cited

U.S. PATENT DOCUMENTS

| | | | |
|---|---|---|---|
| 4,422,296 | * 12/1983 | Dinger et al. | 60/612 |
| 5,063,744 | * 11/1991 | Ishiyama et al. | 60/612 |
| 5,611,202 | * 3/1997 | Sumser et al. | 60/612 |

FOREIGN PATENT DOCUMENTS

| | | | |
|---|---|---|---|
| 4215301A1 | 11/1993 | (DE) . | |
| 4225625A1 | 2/1994 | (DE) . | |
| 3704967C1 | 5/1988 | (DE) | 60/612 |

OTHER PUBLICATIONS

"Die neue Baureihe der RR–Turbolader", Perego, et al., Brown Boveri Mitteilungen, Nr. 4/5, 1971, pp. 3–7.

* cited by examiner

Primary Examiner—Thomas Denion
Assistant Examiner—Thai-Ba Trieu
(74) Attorney, Agent, or Firm—Burns, Doane, Swecker & Mathis, L.L.P.

(57) ABSTRACT

A small turbocharger (8) is connected for the sealing-air supply for a turbocharger (1), which contains a shaft (2), a compressor ($V_1$) fastened to the shaft, and a turbine wheel ($T_1$) fastened to the shaft. The sealing-air pressure is automatically adapted to the turbine inlet pressure.

5 Claims, 1 Drawing Sheet

TURBOCHARGER

FIELD OF THE INVENTION

Figure 1:
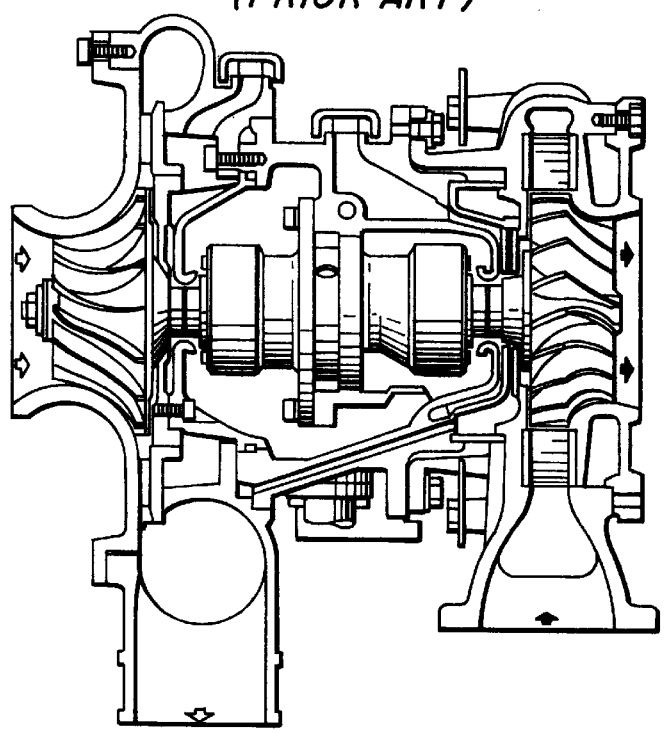

The invention deals with a turbocharger according to the preamble of claim 1.

BACKGROUND OF THE INVENTION

An RR turbocharger, for example, has been disclosed by the Brown Boveri reprint Mitteilungen No. 4/5, 1971. For better understanding, this turbocharger is reproduced in FIG. 1. The turbocharger is composed of a radial compressor having a bladed or unbladed diffuser and of a radial turbine. The rotor of the turbocharger consists of a shaft, on which the turbine wheel is mounted at one end and the compressor wheel is mounted at the other end. In the center part of the housing of the turbocharger, the shaft is mounted on pressure-lubricated plain bearings. The housing, for example, may be uncooled or water-cooled. In order to prevent the exhaust gases from penetrating into the bearing space, sealing air is directed to the turbine hub from the compressor side. The path of the sealing air extracted from the compressor is indicated by white arrows in FIG. 1. In addition, this arrangement achieves a reduced heat flow from the turbine wheel through the shaft to the rotor bearing. Due to being supplied with sealing air, the turbine-side bearing arrangement is not subjected to any higher temperatures than the compressor-side bearing arrangement. The temperature level therefore poses no problem even after the engine has been shut down, so that no undesirable coking of the lubricating oil occurs. In order not to obtain any positive pressure in the bearing space, the spaces on both sides of the bearing space are connected to the atmosphere by passages. The bearing housing is effectively protected against the high temperature of the turbine space by an intermediate wall which is cooled by the sealing air. However, this type of sealing-air supply has an adverse effect in particular when a gas is mixed with the compressor air, which may occur, for example, during the compression of biogas. This may then lead to explosive compositions of the sealing air, which ignite in the hot surroundings of the turbine hub. Direct extraction of the sealing air from the compressor is therefore made impossible. The sealing air enriched with the gas should also not pass into the environment. This is problematical, since external air is often not present in the requisite quantity, and separate compressors constitute a considerable price disadvantage. This applies in particular in the case of turbochargers of variable geometry, (VTG), since these turbochargers have an increased sealing-air requirement.

SUMMARY OF THE INVENTION

One objective of the present invention is to overcome these disadvantages. The invention achieves the object of providing a turbocharger with which it is possible to enrich the compressor air with a gas without having to fear an explosion risk in the case of the sealing air due to an increased temperature of the turbine wheel of the turbocharger. In addition, for reasons of environmental protection, a situation in which the sealing air enriched with the gas mixture is discharged to the surroundings is to be avoided.

According to the invention, this object is achieved in a turbocharger including a small turbocharger which contains a shaft, a compressor fastened to the shaft and having a feed line and a discharge line, and a turbine wheel fastened to the shaft and having a feed line and a discharge line is arranged in such a way that the discharge line of the compressor of the small turbocharger is connected for the sealing-air supply for the turbine wheel of the turbocharger.

A gas may be advantageously mixed with the air of the turbocharger, since the sealing-air supply is effected by the compressor of the small turbocharger. In an exemplary embodiment, the turbocharger is a turbocharger of variable geometry, since this turbocharger is distinguished by increased sealing-air consumption. With the proposed configuration, the sealing-air pressure of the turbocharger is advantageously automatically adapted to the turbine inlet pressure. Furthermore, it is advantageously possible to connect the feed and discharge lines of the small turbine wheel to the feed and discharge lines of the turbine wheel via a common control a pressure reducing element such as a restrictor for example.

Figure 2:
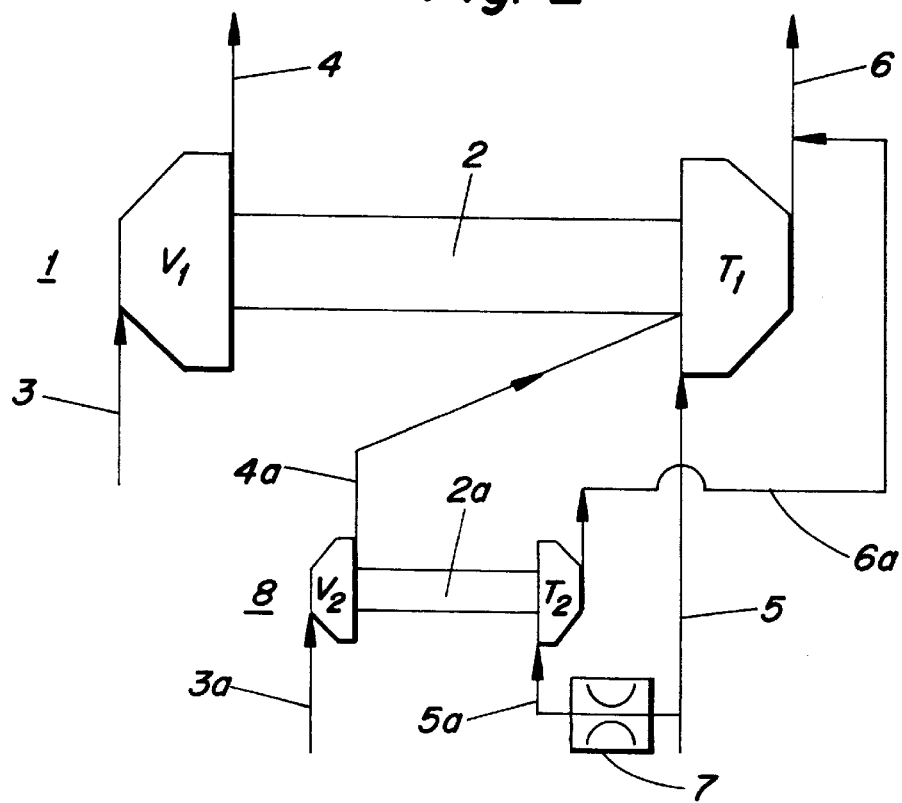

BRIEF DESCRIPTION OF THE DRAWINGS (A) Preferred embodiment/s of the invention is/are disclosed in the following description and illustrated in the accompanying drawings in which:

FIG. 1 shows a turbocharger which has been disclosed by the prior art, having a conventional sealing-air supply for the turbine wheel by air from the compressor, and FIG. 2 shows a turbocharger according to the present invention, using a small turbocharger for the sealing-air supply for the turbocharger.

DETAILED DESCRIPTION OF THE INVENTION

An embodiment of a turbocharger 1 according to the invention is schematically shown in FIG. 2. In principle, the turbine 1, as disclosed by the prior art, consists of a shaft 2, on one end of which a compressor $V_1$ is located and on the other end of which a turbine wheel T, is located. The housing, the bearing arrangements and all the other things disclosed by the prior art have been omitted for the sake of simplicity. The compressor $V_1$ is connected to a feed line 3 and a discharge line 4, just as a feed line 5 and a discharge line 6 are connected to the turbine wheel $T_1$. In an exemplary embodiment, the turbocharger is a turbocharger of variable geometry, since this turbocharger is distinguished by increased sealing-air supply. In the exemplary embodiment shown, the air of the compressor $V_1$ is enriched with a gas and therefore cannot be used as sealing-air supply for the turbine wheel $T_1$, since explosive gas mixtures, which ignite in the vicinity of the hot turbine wheel T1, may arise.

According to the invention, a small turbocharger 8, which is likewise shown only schematically in FIG. 2, is arranged next to the turbocharger 1. In its basic construction, this small turbocharger 8 consists of a shaft 2a, to which a compressor $V_2$ and a turbine wheel $T_2$ are fastened. Feed and discharge lines 3a, 5a, 4a, 6a are connected to both the compressor $V_2$ and the turbine wheel $T_2$. In this case, the feed and discharge lines 5a, 6a of the turbine wheel $T_2$ of the small turbine 8 are connected to the respective feed and discharge lines 5, 6 of the turbine wheel $T_1$, of the turbocharger 1. To control the sealing air, a restrictor 7 or another pressure-reducing element is arranged between the feed line 5 and the feed line 5a in the exemplary embodiment shown. According to FIG. 2, the sealing-air supply for the turbine wheel $T_1$ of the turbocharger 1 is operated by the discharge line 4a of the compressor $V_2$ of the small turbocharger 8. The sealing air is then delivered to the environment in a known manner, but this is not shown in FIG. 2.

This arrangement of a small turbocharger 8 as sealing-air supply for a turbine wheel of a turbocharger 1 has various advantages. The sealing air may be delivered to the environment without hesitation, since—in contrast to the compressor air of the compressor $V_1$—it contains no gas admixture. A further advantage consists in the fact that the pressure of the sealing air in the circuit shown in FIG. 2 is automatically adapted to the turbine inlet pressure.

What is claimed is:

1. A turbocharger for loading an internal combustion engine, comprising:
    a first shaft;
    a first compressor fastened to the first shaft and having a first compressor feed line and a first compressor discharge line;
    a first turbine wheel fastened to the first shaft and having a first feedline and a first discharge line;
    a sealing-air supply for the first turbine wheel;
    a second turbocharger working in series with the first turbocharger and the combustion engine, the second turbocharger, being smaller than the first turbocharger, including:
        a second shaft;
        a compressor fastened to the second shaft and having a second compressor feed line and a second compressor discharge line; and
        a second turbine wheel fastened to the second shaft and having a second feed line and a second discharge line, the second discharge line is connected directly to a sealing-air entry of the first turbine wheel of the first turbocharger.

2. The turbocharger as claimed in claim 1, wherein the first feed line of the first compressor and second feed line of the second compressor are fed with gaseous media of different composition.

3. The turbocharger as claimed in claim 1, wherein the first turbocharger is a turbocharger of variable geometry.

4. The turbocharger as claimed in claim 1, wherein the second feed line of the second turbine wheel of the second turbocharger branches off from the first feed line of the first turbocharger, and the second discharge line of the second turbine wheel of the second turbocharger opens into the first discharge line of the first turbine wheel of the first turbocharger.

5. The turbocharger as claimed in claim 4, wherein a pressure-reducing element is arranged in the second feed line of the second turbine wheel of the second turbocharger.

* * * * *